Aug. 25, 1936.  K. ROTTSIEPER  2,052,422
SO-CALLED SEMISTOP JOINT FOR FLUID FILLED CABLES
Filed June 30, 1934
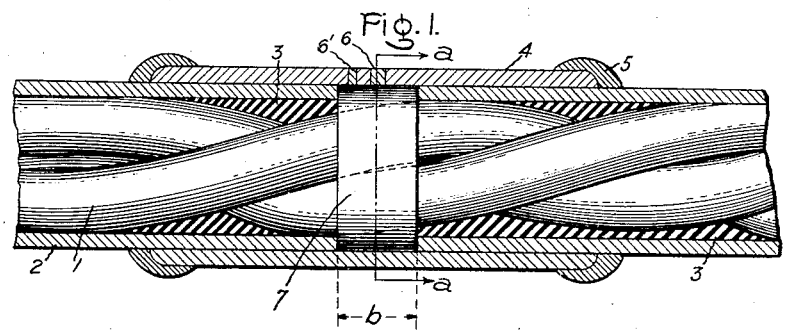
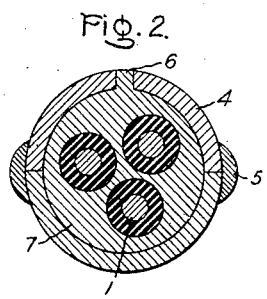
Inventor:
Karl Rottsieper,
by Harry E. Dunham
His Attorney

UNITED STATES PATENT OFFICE 2,052,422

SO-CALLED SEMISTOP JOINT FOR FLUID FILLED CABLES

Karl Rottsieper, Berlin-Adlershof, Germany, assignor to General Electric Company, a corporation of New York Application June 30, 1934, Serial No. 733,223
In Germany October 21, 1933

3 Claims. (Cl. 173—266)

The present invention relates to so-called semistop joints for fluid filled cable. Such stops or joints while they do not prevent slow migration of the fluid filling of the cable from one side of the stop to the other through the cable strands and insulation thereon do act as means to segregate one section or length of cable from another. They are also largely used for the purpose of facilitating the jointing of a pair of cable lengths which are filled with fluid by limiting or preventing the escape of fluid from the open cable ends. The application of these stops as heretofore constructed requires that the cable ends be cut or exposed so that the stop can be slipped longitudinally over the cable to the desired position.

My invention has for its object the provision of a semi-stop of improved construction which may be applied to a cable end, or to an intermediate part of the cable without the necessity of cutting it, and also to the method of making the same.

For a consideration of what I believe to be novel and my invention, attention is directed to the accompanying description and the claims appended thereto.

In the drawing which is illustrative of my invention, Fig. 1 is a longitudinal section of a piece of three conductor cable, and Fig. 2 is a cross section thereof taken on line a—a.

1 indicates an insulated conductor of which there may be one or more, there being three such conductors in the present illustration. The conductors may be insulated in any suitable manner, as for example by using the common construction of tightly wrapped fibrous material impregnated with oil or compound. The insulation on each conductor may be inclosed in a lead or other impervious sheath. The conductors, however formed, are enclosed in a fluid tight enclosure 2 which may be made of lead when the internal pressures are low or of other metal when higher internal pressures are involved. The enclosure 2 may be taken as illustrating a part of a length of cable. Where the cable is made of several spirally arranged conductors contained in a common enclosure, the spaces not occupied by the conductors and their coverings contain fillers 3 usually of jute or equivalent material which are saturated with oil or compound. The insulating saturant thus employed may vary from thin liquid to thick depending upon the kind of cable.

Assuming that it is desired to effect a stoppage of the free flow or movement of liquid used for impregnating the insulation through the cable either for the purpose of jointing adjacent lengths or to interrupt the free flow or movement in a length of cable already laid, the enclosure or sheath 2 is removed for a short length as indicated at b. The fillers 3 are then removed from the spaces between the conductor coverings and the enclosure and also from between the conductors themselves. The fillers are cut as nearly perpendicular to the axis of the cable as possible as the exposed ends thereof serve as a part of a mold or means to hold molten metal in place, as will appear later. The conductors are permitted to remain in their respective normal positions, in other words, within the space defined by the inside wall of the sheath. The next step is to apply a casing 4 around the cable enclosure 1 and to seal the joints between the halves and at the ends by wipe soldered joints 5. If the stop joint is being made near the free end of a cable the casing may be made in one piece but where the joint is being made in a region intermediate between the ends of a section it is made in two or more segmental parts. The upper half of the two-part casing illustrated has two openings 6 and 6', the former for the purpose of receiving molten metal and the latter to permit the escape of air and other gases. As thus applied the casing 4 becomes a permanent part of the cable structure, which bridges the cutaway part of the sheath and thereby strengthens the same.

It will be evident from the foregoing that what may be termed a mold has been prepared composed in part of the cable structure and partly by the casing 4. The next step is to form the fluid stop or dam. For this purpose, a suitable casting metal is employed, for example, an alloy comprising lead-tin-bismuth and cadmium which is commonly known as Wood's metal. Such an alloy, according to its composition, may have a melting point as low as approximately 70° C. Things to be considered are that the metal should not be hot enough to adversely affect the insulation and any other covering on the conductors, and also that when cooled it should be free of cracks and blow holes. As the hot metal is poured into opening 6, it flows around the conductor coverings and completely fills the space between the cut ends of the fillers and also that between the adjacent ends of the enclosure, the air and other gases escaping at 6'. The alloy in cooling shrinks somewhat and in so doing compresses the covering on each of the conductors so that migration of the fluid used in impregnating the insulation is rendered practically negligible. Where the enclosure 2 and the casing 4 are made of lead, the hot selected metal will alloy with the ends of the enclosure or sheath and the central part of the casing and form an effective stop or dam 7 to prevent flow of fluid in the cable from one side of the stop to the other. Stated another way, the body of metal forming the stop firmly holds the conductor covering in compressed state while the peripheral portion of the body is fused to the conductor enclosing parts. Cutting away the enclosure or sheath and the fillers in the manner described results in the formation of an annular space or channel which is perpendicular to the axis of the cable, said space later on being filled with a fused metal body. If each of the conductor insulations is covered with a thin lead sheath, as is sometimes done, and the whole enclosed in an outer sheath, the molten metal forming the stop will fuse to individual sheaths as well as to the outer sheath and to the casing.

Such a stop or dam has numerous advantages:
1. It can be applied to existing cables without cutting the conductors and their insulation;
2. It is relatively cheap and may be used largely as a substitute for the expensive so-called stop joints;
3. It is not attacked by the oil or other impregnating fluid;
4. It may be used anywhere in the cable if it be desired to make further subdivision or segregation without cutting the conductors;
5. It may be used to subdivide the enclosures of different types of cable;
6. It may be used as a pressure seal at the stop end of the cable and
7. Because the metal body is cast into place about the conductors, it will fill all of the unoccupied spaces and thus avoid the necessity of careful setting or aligning of the conductors with respect to the enclosure.

The method of making the seal or stop will naturally vary somewhat in detail depending upon the type of cable and on the location of the stop.

What I claim as new and desire to secure by Letters Patent of the United States is:

1. A fluid stop for electric cables comprising insulated conductors, impregnating fluid for the insulation, a metallic enclosure therefor, fillers occupying the space within the enclosure between the inner wall thereof and the surfaces of the conductors, said enclosure and the fillers being cut away to define an annular space which is perpendicular to the axis of the cable, an enclosure for the cut away portion of the metallic enclosure, and a metallic body filling the annular space and united at its periphery with a wall of the enclosure, said body having openings through which the conductors extend, the walls of the openings holding the insulation on the conductors in compression, said fillers acting to limit the lateral spreading of the metal forming the metallic body.

2. In combination, a cable having an enclosing lead sheath having a cut-away portion at a point intermediate the ends thereof, continuous individually insulated conductors permanently lying within the space defined by the inside wall of the sheath, longitudinally extending fillers located in the spaces between the conductors and filling them to the substantial exclusion of voids, the parts of the fillers in line with the cut-away portion of the sheath being removed, a body of liquid which impregnates the insulation on the conductors and also the fillers, a casing which snugly fits over the ends of the cable sheath, covers the cut-away portion thereof and is sealed at its ends to the sheath, said casing having filling opening means, and a body of relatively low melting point metal which fills the space originally occupied by the removed parts of the fillers and prevents the free passage of liquid from one part of the cable to the other.

3. The method of making a liquid stop joint for electric cables of the type having uninterrupted insulated conductors, fillers in the spaces between the conductors, a body of liquid insulation and a sheath which comprises cutting a short piece out of the sheath to define an opening, cutting and removing the portions of the fillers which are aligned with the opening without disturbing the conductors, applying an axially divided casing tightly over the sheath to cover the opening, and filling the space formerly occupied by the fillers with a body of molten metal at such a temperature as to cause fusion with the sheath prior to cooling.

KARL ROTTSIEPER.